United States Patent [19]

Yoshimoto et al.

[11] Patent Number: 5,265,077
[45] Date of Patent: Nov. 23, 1993

[54] OPTICAL DISK STORAGE HAVING REDUCED POWER CONSUMPTION DURING SEEKING OPERATIONS

[75] Inventors: Kyosuke Yoshimoto; Teruo Furukawa; Minoru Ozaki, all of Amagasaki; Akira Mashimo, Tokorozawa; Hiroyuki Onda, Houya, all of Japan

[73] Assignees: Mitsubishi Electric Corporation, Japan; Teac Corporation, Japan

[21] Appl. No.: 728,631

[22] Filed: Jul. 11, 1991

[30] Foreign Application Priority Data

Jul. 16, 1990 [JP] Japan .................. 2-187438
Jul. 16, 1990 [JP] Japan .................. 2-187439
Jul. 20, 1990 [JP] Japan .................. 2-192489

[51] Int. Cl.⁵ .............................................. G11B 7/00
[52] U.S. Cl. ........................................................ 369/32
[58] Field of Search ................. 369/32, 44.26, 44.27, 369/44.28, 44.25; 360/75, 78.04, 78.08, 78.06; 371/5.5, 14

[56] References Cited

U.S. PATENT DOCUMENTS

| 4,086,636 | 4/1978 | Cizmic et al. | 360/75 |
| 4,907,109 | 3/1990 | Senio | 360/78.04 |
| 4,979,059 | 12/1990 | Sengoku | 360/78.04 |
| 5,016,121 | 5/1991 | Peddle et al. | 360/78.04 |
| 5,050,146 | 9/1991 | Richgels et al. | 369/44.28 |

Primary Examiner—Donald E. McElheny, Jr.
Attorney, Agent, or Firm—Andrus, Sceales, Starke & Sawall

[57] ABSTRACT

In an optical disk storage, the seek of an optical head is controlled so that the number of seek times cannot exceed a threshold number of times in a predetermined period or an accumulated seek period cannot exceed a threshold period in a predetermined period. Therefore, a wasteful power consumption and a rise in the internal temperature associated with the seek activity can be effectively prevented.

11 Claims, 8 Drawing Sheets

OPTICAL DISK STORAGE HAVING REDUCED POWER CONSUMPTION DURING SEEKING OPERATIONS

BACKGROUND OF THE PRESENT INVENTION

The present invention relates generally to optical disk storages, and more particularly to an optical disk storage in which a wasteful consumption of the driving current and a rise in the internal temperature associated with the seek activity can be effectively prevented.

Seek means for quickly moving an optical head to a desired cylinder or track has been known. Such seek means comprises a positioner which radially moves the optical head and a position detector which detects the position of the optical head. The positioner moves the optical head from the present position detected by the position detector to a desired cylinder or track. Incidentally, the optical disk is inserted into and ejected from an enclosed housing so that dust cannot be attached to the disk.

However, the above conventional optical disk storage has the following disadvantages. That is, a rise of the power consumption is accompanied with the frequency of the seek operations at a high speed. In addition, the internal temperature of the storage rises to negatively affect the recording and/or reproducing, such as a expansion and warp of the optical disk, and a short life of the laser diode used for the optical head.

SUMMARY OF THE INVENTION

Accordingly, it is a general object of the present invention to provide a novel and useful optical disk storage in which above disadvantages are eliminated.

Another object of the present invention is to provide an optical disk storage having seek means in which a wasteful power consumption and a rise in the internal temperature can be effectively prevented.

According to one feature of the present invention, an optical disk storage comprises an optical head which records/reproduces information on/from an optical disk, seek means for moving said optical head to a desired track or cylinder on the optical disk, and first control means for controlling the seek means so that the seek means cannot move said optical head more than a threshold number of times in a predetermined period.

According to another feature of the present invention, an optical disk storage comprises an optical head which records/reproduces information on/from an optical disk, seek means for moving said optical head to a desired track or cylinder on the optical disk, and second control means for controlling the seek means so that the seek means cannot move the optical head for more than a threshold period in a predetermined period.

According to the present invention, since the first and second control means controls the seek means so that the number of seek times or the accumulated seek period can be maintained below the threshold times or period, the wasteful power consumption and the rise in the internal temperature can be prevented.

Other objects and further features of the present invention will become apparent from the following detailed description when read in conjunction with the accompanying drawings.

DESCRIPTION OF THE PREFERRED EMBODIMENTS

Figure 1:
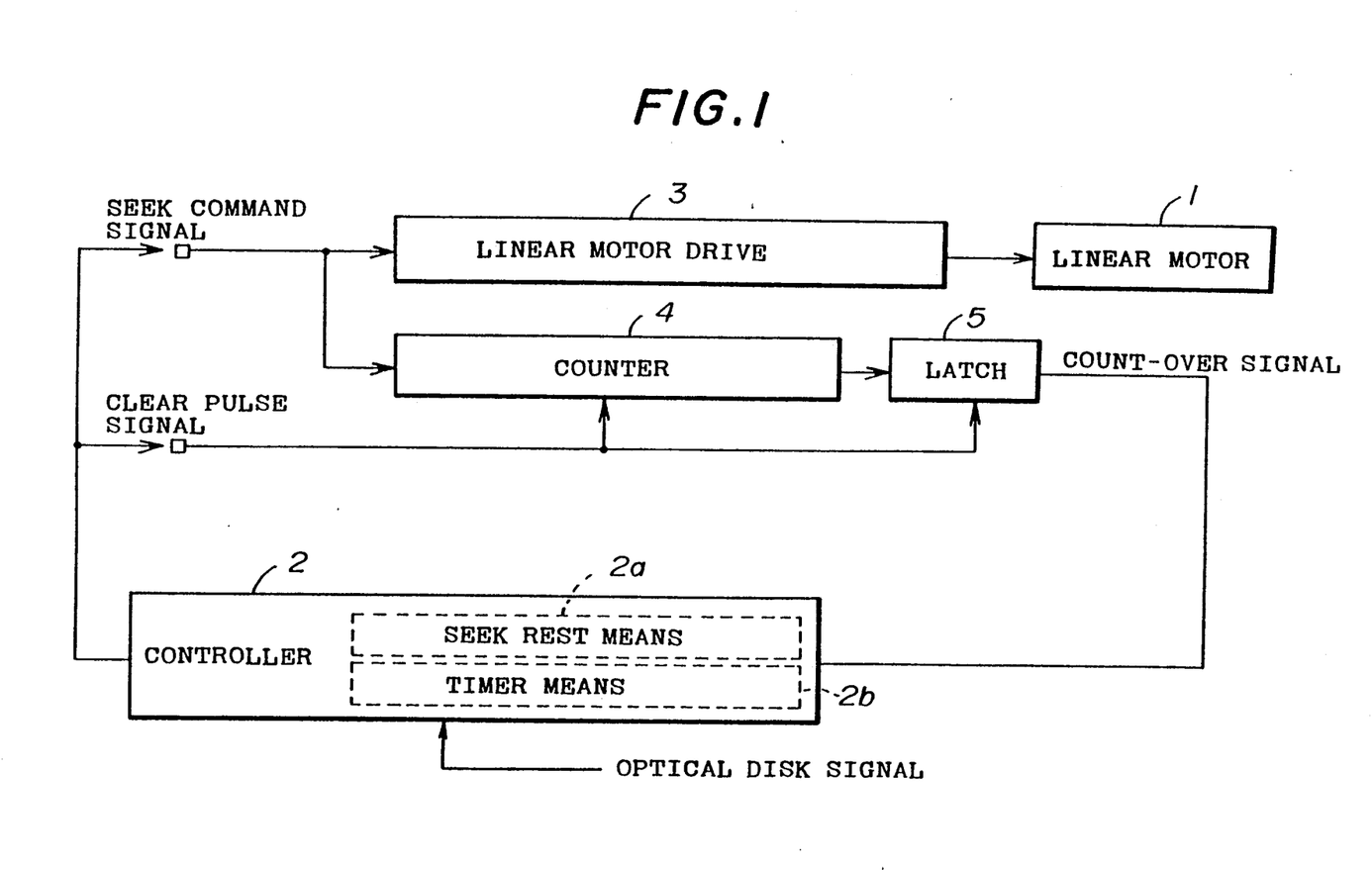
FIG. 1 shows a block diagram of a seek control system in an optical disk storage of a first embodiment according to the present invention.

A seek control system in the optical disk storage of the first embodiment according to the present invention comprises, as shown in FIG. 1, a linear motor 1, a controller 2, a linear motor driver 3, a counter 4 and a latch 5. The linear motor 1 is connected to the linear motor driver 3 and the counter 4 is connected to the latch 5. The controller 2 is connected to respective linear motor driver 3, counter 4 and latch 5.

The linear motor 1 drives a head actuator having an optical head (not shown) so that the optical head can be radially moved to a desired track or cylinder.

The controller 2 controls this seek control system. The controller 2 transmits a seek command signal, instructing the optical head to move to the desired track or cylinder, to the linear motor driver 3 and the counter 4. In addition, the controller 2 comprises seek rest means 2a and timer means 2b therein. The seek rest means 2a interrupts the seek activity of the optical head to establishes a rest state under a predetermined condition which will be described later. The timer means 2b measures the predetermined period used for the predetermined condition in response to an optical disk signal. Hereupon, the term "the optical disk signal", as used herein, means a signal representing the inserting/ejecting of the optical disk. Incidentally, the timer means 2b may respond and start in synchronization with the first seek command signal.

Moreover, the controller 2 outputs a clear pulse signal to the counter 4 and the latch 5 for every period T. The clear pulse signal releases the rest state of the optical head. The period T is determined by taking into consideration the seek times and the rise of the internal temperature of the storage. Furthermore, the controller 2 judges whether or not a value counted by the counter 4 reaches a threshold N based on a count-over signal input from the latch 5.

The linear motor driver 3 drives the linear motor 1 based on the seek command signal.

The counter 4 counts the number of seek times. The counter 4 has the threshold N, and outputs the count-over signal to the latch 5 if the counted value exceeds the threshold N. The threshold N is determined by taking into consideration the number of seek times and the rise of the internal temperature of the storage. Limitation of the number of seek times can restrict the rise of the internal temperature of the storage and achieve the low power consumption.

The latch 5 latches the count-over signal to transmit it to the seek rest means 2a of the controller 2.

Figure 2:
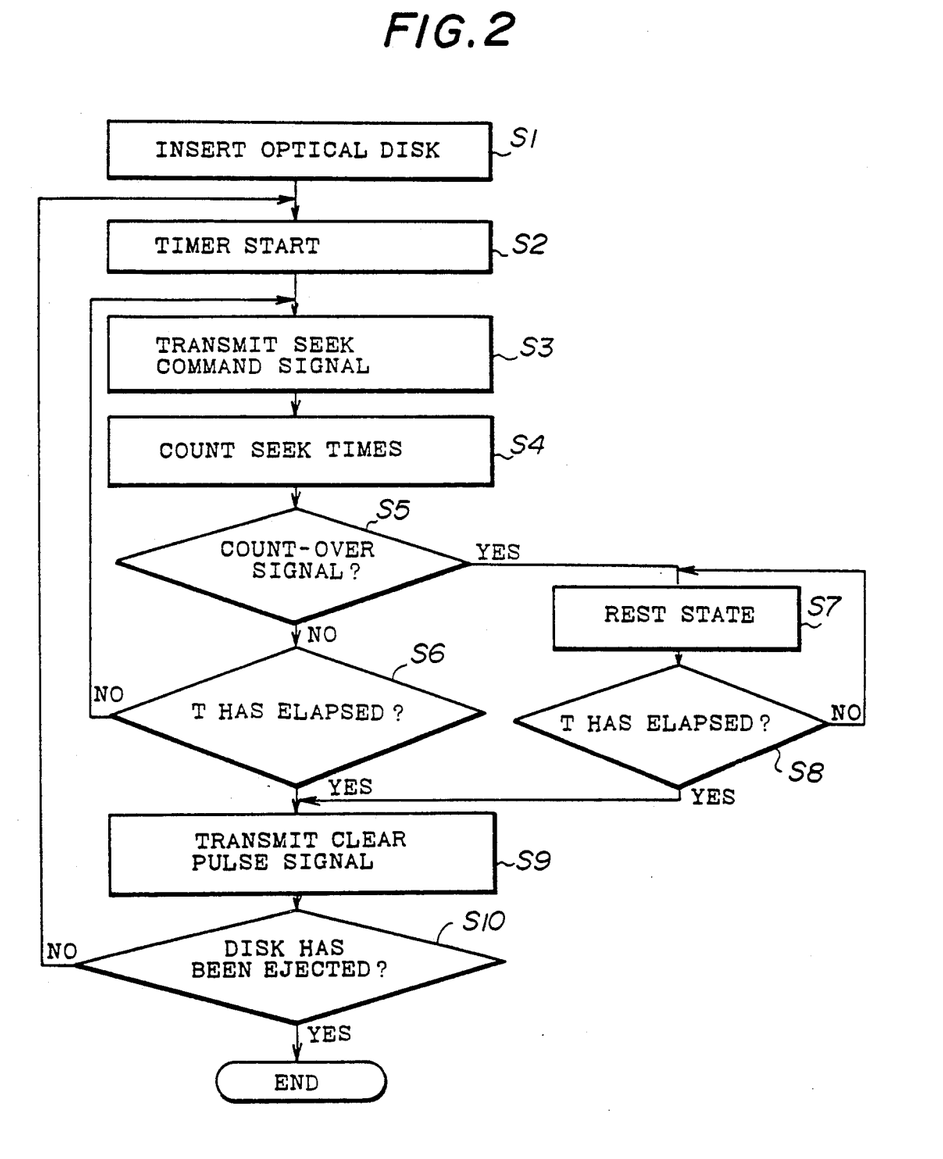
FIG. 2 shows a flowchart executed by the controller shown in FIG. 1.

Next, a description will now be given of the operation of the seek control system shown in FIG. 1 with reference to FIG. 2. When the optical disk is inserted into the optical disk storage (in step S1), the timer means 2b starts in response to the optical disk signal (in step S2). On the other hand, the controller 2 outputs the seek command signal to the linear driver 3 (in step S3), and the optical head is moved to the desired track or cylinder by the linear motor 1. The seek command signal is also supplied to the counter 4, and the number of seek times is counted thereby (in step S4). If the number of seek times exceeds the threshold N, the counter 4 outputs the count-over signal to the latch 5. The latch 5 latches the count-over signal and outputs it to the controller 2. The controller 2 judges the presence of the count-over signal (in step S5). If the count-over signal has not been input thereto, the controller 2 judges whether or not the time T has elapsed by means of timer means 2b (in step S6). If the time T has not elapsed, the procedure is fed back to the step S3.

On the other hand, if the count-over signal is input to the controller 2 in the step S5, the seek rest means 2a interrupts the controller 2 to transmit the seek command signal and establishes the rest state (in step S7). Subsequently, the timer means 2b judges whether or not the time T has elapsed (in step S8), and the rest state continues until the time T has elapsed.

If the time T is judged to have elapsed in the steps S6 and S8, the controller 2 outputs the clear pulse signal to the counter 4 and the latch 5 (in step S9). Lastly, the controller 2 judges whether or not optical disk has been ejected by means of the optical disk signal (in step S10). If the optical disk has been ejected, the procedure is terminated, but if not, the procedure is fed back to the step S2.

Figure 3:
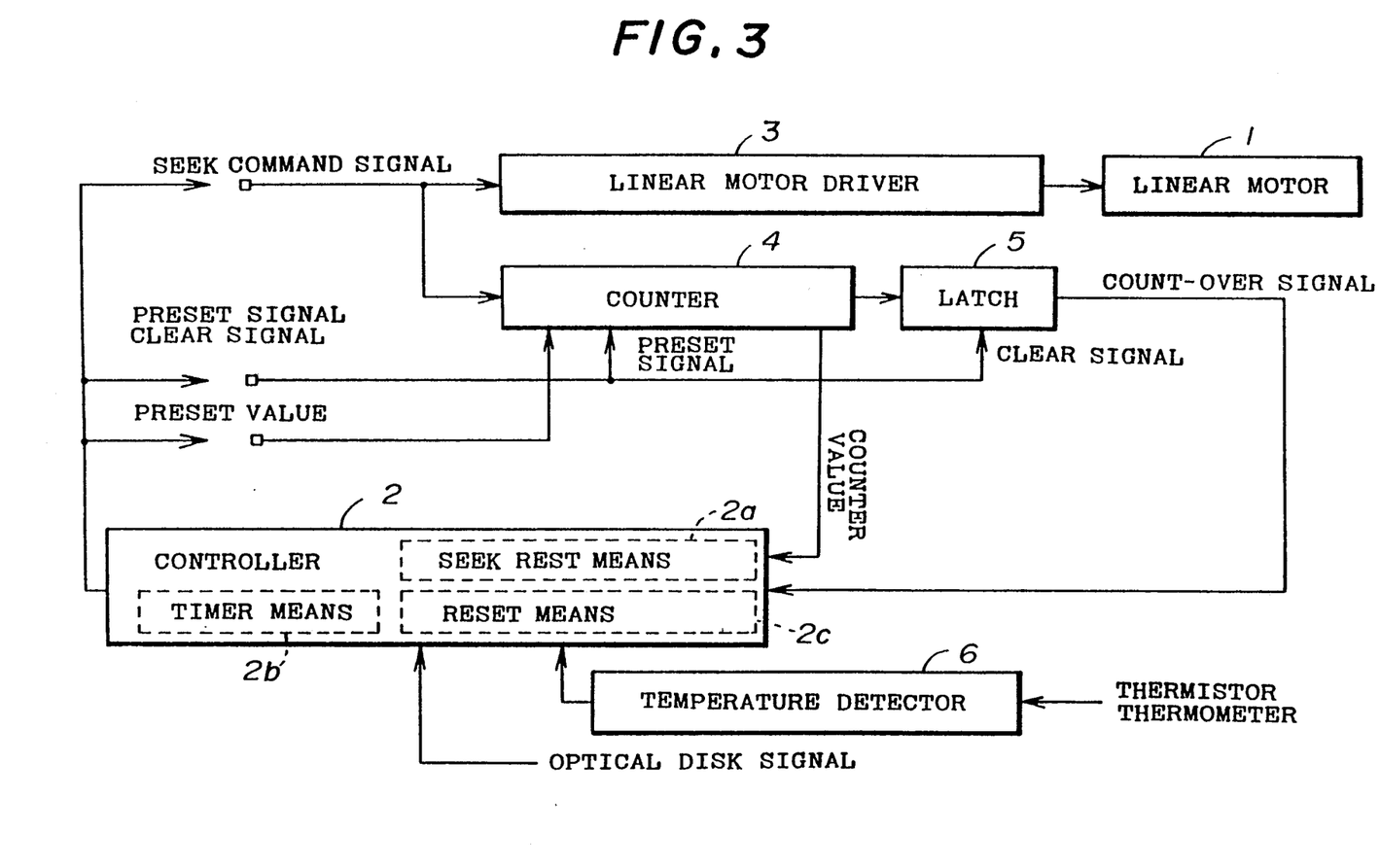
FIG. 3 shows a block diagram of a seek control system in an optical disk storage of a second embodiment according to the present invention.
Figure 4:
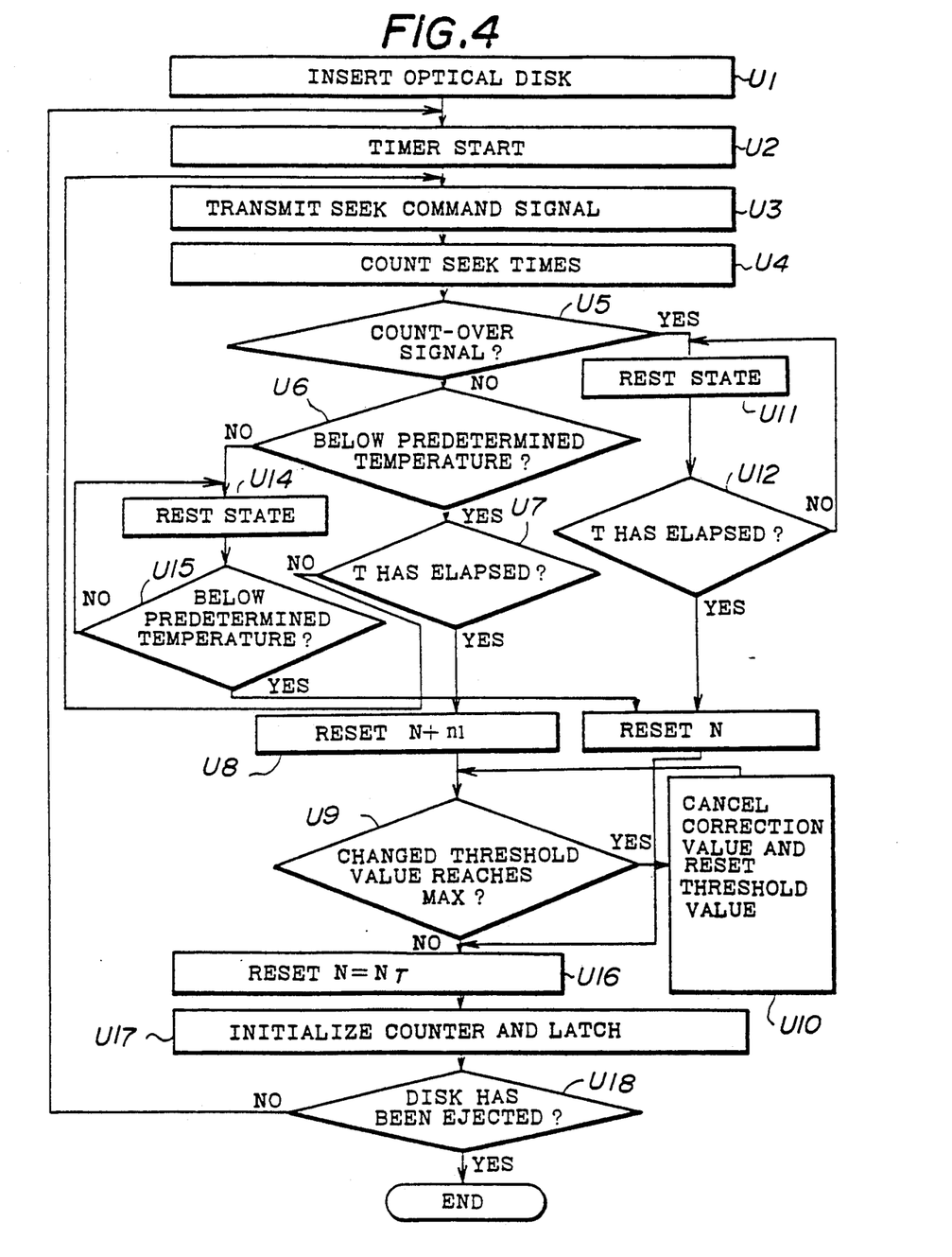
FIG. 4 shows a flowchart executed by the controller shown in FIG. 3.

Next, a description will now be given of the optical disk storage of the second embodiment according to the present invention with reference to FIGS. 3 and 4. Incidentally, those elements which are the same as corresponding elements in FIG. 1 are designated by the same reference numerals, and the description thereof will be omitted.

The optical disk storage of this embodiment further comprises a temperature detector 6 connected to the controller 2 in addition to those elements shown in FIG. 1. The temperature detector 6 is connected to a thermistor thermometer provided within the optical disk storage to measure the internal temperature thereof. The temperature detector 6 outputs the internal temperature to the controller 2.

The controller 2 further comprises reset means 2c. The internal temperature of the storage is informed from the temperature detector 6 to the reset means 2c, so that the reset means 2c judges whether or not the internal temperature is kept below the predetermined temperature. The reset means 2c outputs the clear signal to the latch 5 and the preset signal and the preset value to the counter 4 if the count-over signal is input from the latch 5 thereto or the timer means 2b detects the elapsed time T.

The counter 4 has a threshold to be changed by the preset signal and the preset value. The counter 4 outputs the count-over signal to the controller 2 via the latch 5 and directly outputs the counted value thereto.

Next, a description will now be given of the operation of the seek control system shown in FIG. 3 with reference to FIG. 4. When the optical disk is inserted into the optical disk storage (in step U1), the timer means 2b starts responsive to the optical disk signal (in step U2). On the other hand, the controller 2 outputs the seek command signal to the linear driver 3 (in step U3), and thus the optical head is radially moved to the desired track or cylinder by the linear motor 1. The seek command signal is also supplied to the counter 4, and the number of seek times is counted thereby (in step U4). The number of seek times exceeds the threshold N, the counter 4 outputs the count-over signal to the latch 5. The latch 5 latches the count-over signal and outputs it to the controller 2. The controller 2 judges the presence of the count-over signal (in step U5). If the count-over signal has not been input thereto, the controller 2 judges whether or not the internal temperature of the storage kept below the predetermined temperature (in step U6). If the internal temperature is kept below the predetermined temperature, the controller 2 judged whether or not the time T has elapsed by means of timer 2b (in step U7). If the time T has not elapsed, the procedure is fed back to the step U3.

If the controller 2 detects the elapsed time T in the step U7, the reset means 2c outputs the preset signal and the preset value to the counter 4 so as to change the threshold N (in step U8). For example, if it is assumed that the initial threshold is N and the counter 4 counts up $(N-n_1)$ times, less than N by $n_1$, in a first period T, the threshold of the next period T is changed to be $(N+n_1)$ by adding $n_1$ to N. Thus, the average threshold becomes always N. If the counter 4 counts up $(N-n_2)$ times, the threshold of the further next period is changed to be $(N+n_1+n_2)$. Hereupon, each of $n_1, n_2 \ldots$ are referred to as a correction value hereinafter.

However, the changed threshold reaches the allowable maximum value (in step U9), the controller 2 cancels the correction value by the preset signal, and resets the threshold by the preset value (in step U10). In this case, the threshold is made by canceling the oldest correction value, for example $n_1$, and the procedure is fed back to the step U9.

On the other hand, if the count-over signal is input to the controller 2 in the step U5, the seek rest means 2a interrupts the controller 2 to transmit the seek command signal and establishes the rest state (in step U11). Subsequently, the timer means 2b judges whether or not the time T has elapsed (in step U12), and the rest state continues until the time T has elapsed. If the time T has elapsed, the threshold of the counter 4 is reset to be the initial threshold N by canceling all the correction values (in step U13).

If the internal temperature of the storage becomes more than the predetermined temperature, the seek rest means 2a interrupts the controller 2 to transmit the seek command signal and establishes the rest state (in step U14). Then, the controller 2 judges whether or not the internal temperature of the storage is kept below the predetermined temperature (in step U15). If the internal temperature becomes above the predetermined temperature, the rest state is continuously maintained, but if not, the threshold is reset to be N (in step U13).

Incidentally if the changed threshold does not reach the allowable maximum value even if the internal temperature is below the predetermined temperature (in step U9), the threshold N is reset to be $N_T$ by means of the preset signal and the preset value output from the reset means 2c (in step U16). That is, if the internal temperature is relatively high, the threshold is kept low, and if the internal temperature is relatively low, the threshold is kept high. Thus, the optical head can be effectively sought despite of the rise of the internal temperature. Then, the controller 2 outputs the preset signal and the preset value to the counter 4 and clear signal to the latch 5 (in step U17) to initialize them. Lastly, the controller 2 judges whether or not optical disk has been ejected by means of the optical disk signal (in step U18). If the optical disk has been ejected, the procedure is terminated, but if not, the procedure is fed back to the step U2.

Incidentally, the limitation of the number of seek times may be controlled independently by the respective counted value and the internal temperature.

Figure 5:
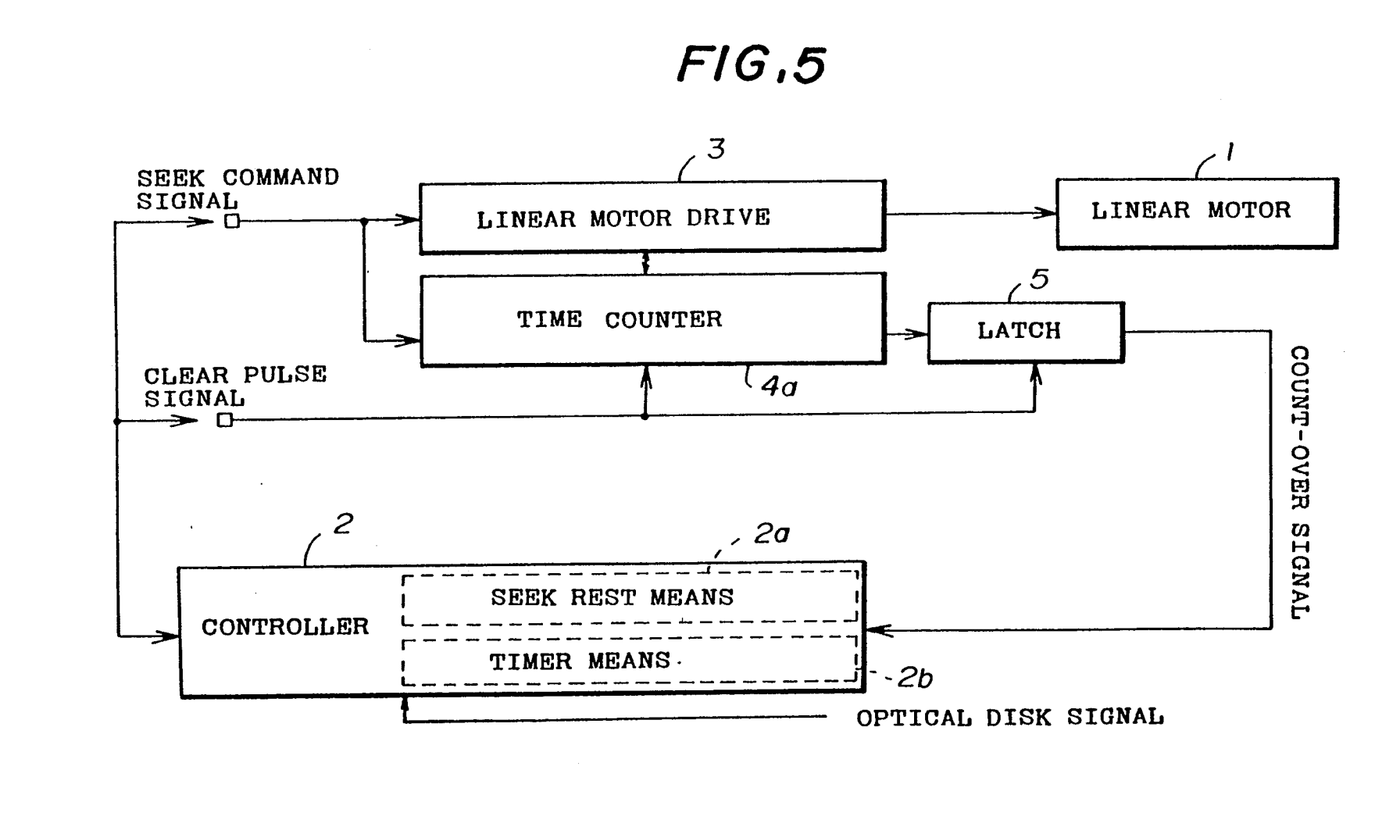
FIG. 5 shows a block diagram of a seek control system in an optical disk storage of a third embodiment according to the present invention.
Figure 6:
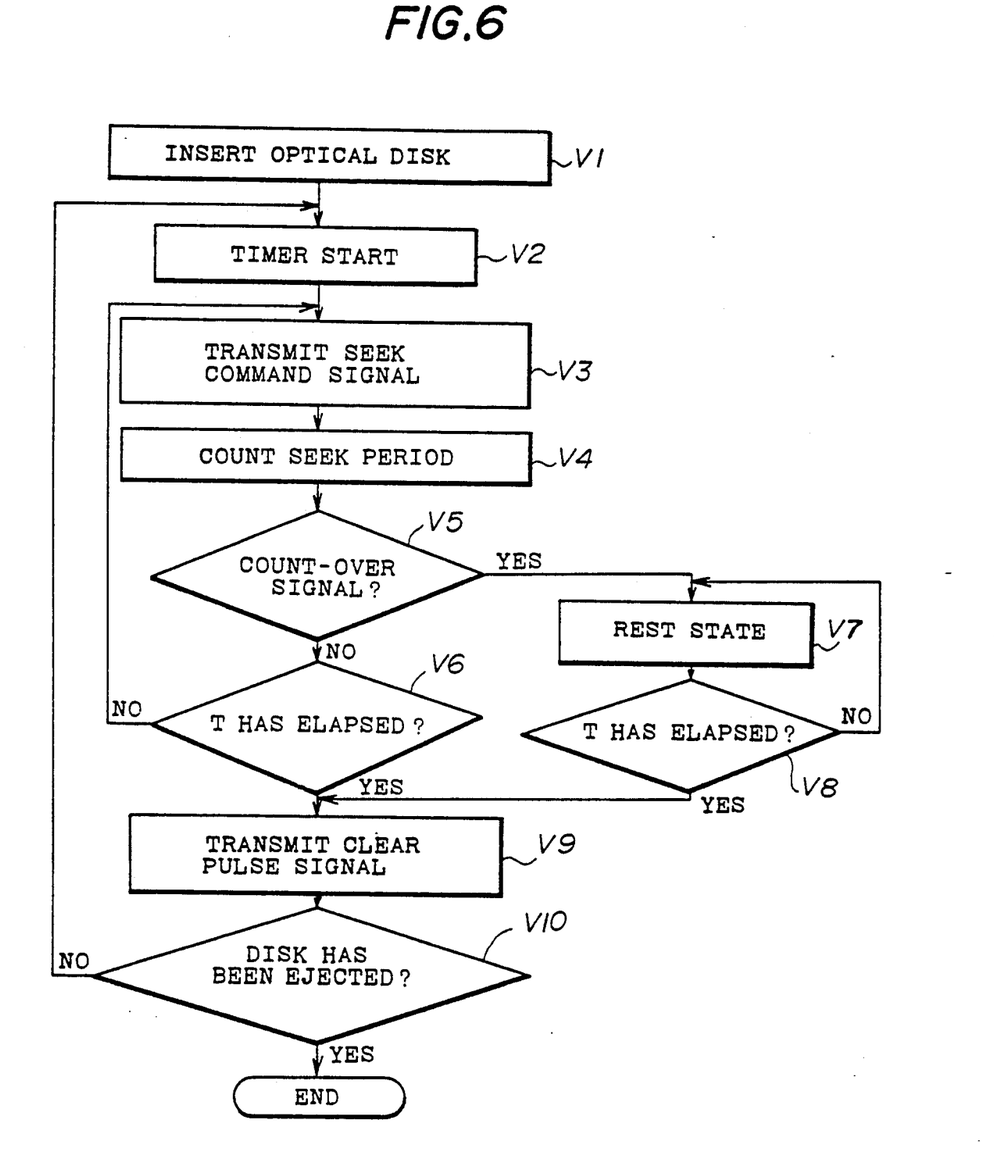
FIG. 6 shows a flowchart executed by the controller shown in FIG. 5.

Next, a description will now be given of the optical disk storage of the third embodiment according to the present invention with reference to FIGS. 5 and 6. Incidentally, those elements which are the same as corresponding elements in FIGS. 1 and 3 are designated by the same numerals, and the description thereof will be omitted. In this embodiment, the counter 4 shown in FIG. 1 is substituted by a time counter 4a. The time counter 4a is connected to the linear motor driver 3. The time counter 4a measures the accumulated seek period. The time counter 4a has a threshold $t_1$, and outputs the count-over signal to the latch 5 if the counted seek period exceeds the threshold $t_1$. The threshold $t_1$ is established by taking into consideration the seek period and a rise of the internal temperature. The time counter 4a detects a start of a seek by the seek command signal, and an end of the seek by the halt of the liear motor 1 via the linear motor driver 3. The limitation of the accumulated seek period can restrict the rise of the internal temperature and obtain the low power consumption.

Next, a description will now be given of the operation of the seek control system shown in FIG. 5 with reference to FIG. 6. When the optical disk is inserted into the optical disk storage (in step V1), the timer means 2b starts responsive to the optical disk signal (in step V2). On the other hand, the controller 2 outputs the seek command signal to the linear driver 3 (in step V3), and the optical head is radially moved to the desired track or cylinder by the linear motor 1. The seek command signal is also supplied to the time counter 4a, and the accumulated seek period is measured thereby (in step V4). If the measured seek period exceeds the threshold $t_1$, the time counter 4a outputs the count-over signal to the latch 5. The latch 5 latches and outputs the count-over signal to the controller 2. The controller 2 judges the presence of the count-over signal (in step V5). If the count-over signal has not been input thereto, the controller 2 judges whether or not the time T has elapsed by means of timer means 2b (in step V6). If the time T has not elapsed, the procedure is fed back to the step V3.

On the other hand, if the count-over signal is input to the controller 2 in the step V5, the seek rest means 2a interrupts the controller 2 to transmit the seek command signal and establishes the rest state (in step V7). Subsequently, the timer means 2b judges whether or not the time T has elapsed (in step V8), and the rest state continues until the time T has elapsed.

If the time T is judged to have elapsed in the steps V6 and V8, the controller 2 outputs the clear pulse signal to the time counter 4 and the latch 5 (in step V9). Lastly, the controller 2 judges whether or not optical disk has been ejected by means of the optical disk signal (in step V10). If the optical disk has been ejected, the procedure is terminated, but if not, the procedure is fed back to the step V2.

Figure 7:
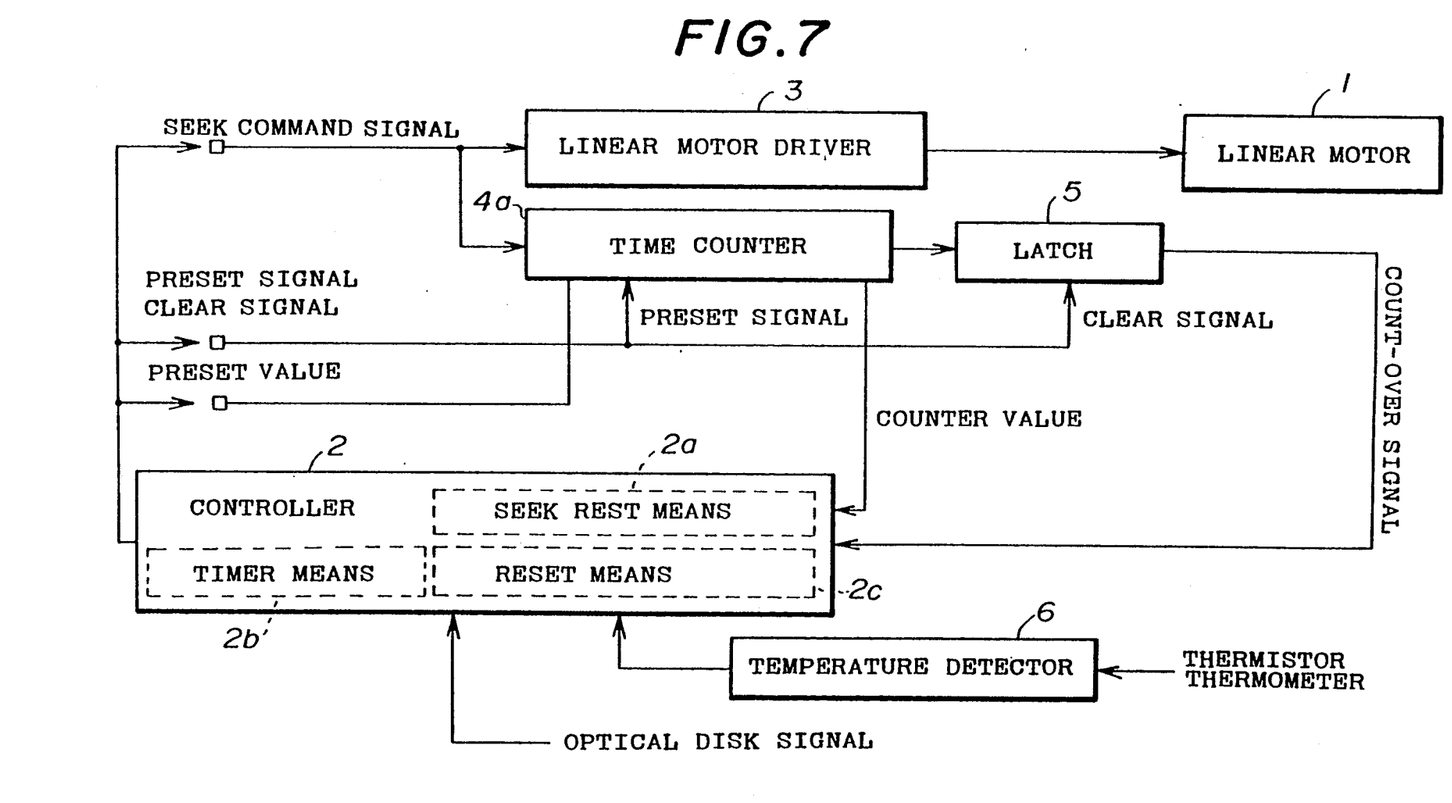
FIG. 7 shows a block diagram of a seek control system in an optical disk storage of a fourth embodiment according to the present invention.
Figure 8:
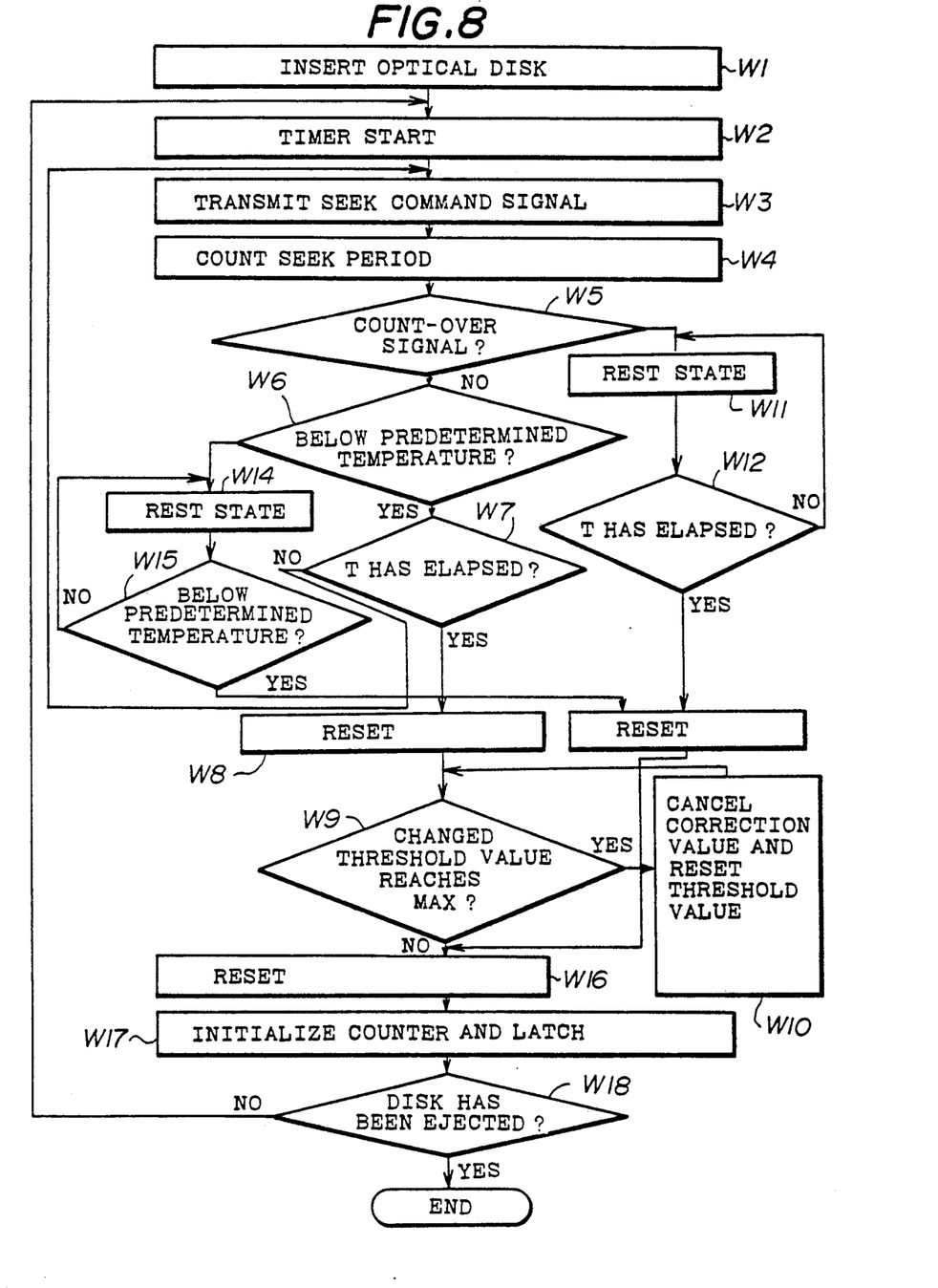
FIG. 8 shows a flowchart executed by the controller shown in FIG. 7.

Next, a description will now be given of the optical disk storage of the fourth embodiment according to the present invention with reference to FIGS. 7 and 8. Incidentally, those elements which are the same as corresponding elements in FIGS. 1, 3 and 5 are designated by the same numerals, and the description thereof will be omitted. In this embodiment, the counter 4 of the second embodiment is substituted by the time counter 4a of the third embodiment.

Next, a description will now be given of the operation of the seek control system shown in FIG. 7 with reference to FIG. 8. When the optical disk is inserted into the optical disk storage (in step W1), the timer means 2b starts responsive to the optical disk signal (in step W2). On the other hand, the controller 2 outputs the seek command signal to the linear driver 3 (in step W3), and thus the optical head is moved to the desired track or cylinder via the linear motor 1. The seek command signal is also supplied to the time counter 4a, and the accumulated seek period is measured thereby (in step W4). The accumulated seek period exceeds the threshold $t_1$, the counter 4a outputs the count-over signal to the latch 5. The latch 5 latches the count-over signal and outputs it to the controller 2. The controller 2 judges the presence of the count-over signal (in step W5). If the count-over signal has not been input thereto, the controller 2 judges whether or not the internal temperature of the storage kept below the predetermined temperature (in step W6). If the internal temperature is kept below the predetermined temperature, the controller 2 judges whether or not the time T has elapsed by means of timer means 2b (in step W7). If the time T has not elapsed, the procedure is fed back to the step W3.

If the controller 2 detects the elapsed time T in the step W7, the reset means 2c outputs the preset signal and the preset value to the time counter 4a so as to change the threshold $t_1$ (in step W8). For example, if it is assumed that the initial threshold is $t_1$ and the time counter 4 measures for $(t_1-n_1)$ period, less than $t_1$ by $n_1$, in a first period T, the threshold of the next period T is changed to be $(t_1+n_1)$ by adding $n_1$ to $t_1$. Thus, the average threshold becomes always $t_1$. If the time counter 4 measures for $(t_1-n_2)$ period, the threshold of the further next period is changed to be $(t_1+n_1+n_2)$. Hereupon, each of $n_1$, $n_2$ . . . are referred to as a correction value hereinafter.

However, the changed threshold reaches the allowable maximum value (in step W9), the controller 2 cancel the correction value by the preset signal, and resets the threshold by the preset value (in step W10). In this case, the threshold is made by canceling the oldest correction value, for example $n_1$, and the procedure is fed back to the step W9.

On the other hand, if the count-over signal is input to the controller 2 in the step W5, the seek rest means 2a interrupts the transmitting of the seek command signal so as to establish the rest state (in step W11). Subsequently, the timer means 2b judges whether or not the time T has elapsed (in step W12), and the rest state continues until the time T has elapsed. If the time T has elapsed, the threshold of the counter 4 is reset to be the initial threshold $t_1$ by canceling all the correction values (in step W13).

If the internal temperature of the storage becomes more than the predetermined temperature, the seek rest means 2a interrupts the controller 2 to transmit the seek command signal and establishes the rest state (in step W14). Then, the controller 2 judges whether or not the internal temperature of the storage is kept below the predetermined temperature (in step W15). If the internal temperature becomes above the predetermined temperature, the rest state is continuously maintained, but if not, the threshold is reset to be $t_1$ (in step W13).

Incidentally, if the changed threshold does not reach the allowable maximum value even if the internal temperature is below the predetermined temperature (in step W9), the threshold $t_1$ is reset to be $t_T$ by means of the preset signal and the preset value output from the reset means 2c (in step W16). That is, if the internal temperature is relatively high, the threshold is kept low, and if the internal temperature is relatively low, the threshold is kept high. Thus, the optical head can be effectively sought despite the rise of the internal temperature. Then, the controller 2 outputs the preset signal and the preset value to the counter 4 and clear signal to the latch 5 (in step W17) to initialize them. Lastly, the controller 2 judges whether or not optical disk has been ejected by means of the optical disk signal (in step W18). If the optical disk has been ejected, the procedure is terminated, but if not, the procedure is fed back to the step W2.

Further, the present invention is not limited these preferred embodiment, but various variations and modifications may be made within the scope of the present invention.

What is claimed is:

1. An optical disk storage comprising:
   an optical head which records/reproduces information on/from an optical disk;
   seek means for moving said optical head to a desired track or cylinder on the optical disk; and
   first control means for controlling said seek means so that said seek means cannot move said optical head more than a threshold number of times in a predetermined period.

2. An optical disk storage according to claim 1, wherein said first control means comprises:
   timer means for measuring the predetermined period;
   counter means, coupled to said seek means, for counting a number of seek times which the optical head is moved by said seek means;
   first judging means, coupled to the timer means and the counter means, for judging whether or not the number of seek times exceeds the threshold number of times in the predetermined period; and
   seek rest means, coupled to said seek means and the first judging means, for interrupting said seek means from moving said optical head for the rest of the predetermined period if the first judging means has judged that the number of seek times exceeds the threshold number of times.

3. An optical disk storage according to claim 1, wherein said optical disk storage further comprises reset means for changing the threshold number of times.

4. An optical disk storage according to claim 2, wherein said optical disk storage further comprises reset means for changing the threshold number of times based on the number of seek times counted by the counter means.

5. An optical disk storage according to claim 4, wherein the reset means establishes a new threshold number of times by adding a difference between the threshold number of times and the number of seek times to the threshold times if the number of seek times does not exceed the threshold number of times.

6. An optical disk storage according to claim 3 wherein said optical disk storage further comprises temperature detecting means for detecting an internal temperature thereof, said reset means changes the threshold number of times based on the temperature detected by said temperature detecting means.

7. An optical disk storage comprising:
   an optical head which records/reproduces information on/from an optical disk;
   seek means for moving said optical head to a desired track or cylinder on the optical disk; and
   second control means for controlling said seek means so that said seek means cannot move said optical head more than a threshold period in a predetermined period.

8. An optical disk storage according to claim 7, wherein said second control means comprises:
   first timer means for measuring the predetermined period;
   second timer means, coupled to said seek means, for measuring an accumulated seek period for which said optical head is moved by said seek means;
   second judging means, coupled to the first and second timer means, for judging whether or not the accumulated seek period exceeds the threshold period in the predetermined period; and
   seek rest means, coupled to said seek means and the second judging means, for interrupting the said seek means from moving said optical head for the rest of the predetermined period of the second judging means has judged that the accumulated seek period exceeds the threshold period.

9. An optical disk storage according to claim 7, wherein said optical disk storage further comprises reset means for changing the threshold period.

10. An optical disk storage according to claim 8, wherein said optical disk storage further comprises reset means for changing the threshold period based on the accumulated seek period measured by the second timer means.

11. An optical disk storage according to claim 9, wherein said optical disk storage further comprises temperature detecting means for detecting an internal temperature thereof, said reset means changes the threshold period based on the temperature detected by said temperature detecting means.

* * * * *